United States Patent [19]

Weinert

[11] Patent Number: 4,736,416

[45] Date of Patent: Apr. 5, 1988

[54] TELEPHONE STERILIZER HAVING AN OZONE GAS PRODUCING UNIT

[76] Inventor: Friedrich Weinert, 219-19-131st Ave., New York, N.Y. 11413

[21] Appl. No.: 906,382

[22] Filed: Sep. 12, 1986

Related U.S. Application Data

[63] Continuation-in-part of Ser. No. 668,719, Nov. 6, 1984, Pat. No. 4,613,928.

[51] Int. Cl.⁴ .................. H04M 1/17; H04M 1/06; A61L 2/00; A61L 2/24
[52] U.S. Cl. ................... 379/439; 379/422; 379/452; 422/28
[58] Field of Search ........... 179/185, 186, 182 R, 179/182 A, 187; 422/28; 379/422, 424–426, 435–437, 439, 451, 452

[56] References Cited

U.S. PATENT DOCUMENTS

| | | | |
|---|---|---|---|
| 2,495,034 | 1/1950 | Sullivan | 379/452 |
| 2,697,173 | 12/1954 | Balakofsky | 379/452 |
| 2,952,749 | 9/1960 | Cobb et al. | 379/439 |
| 3,040,138 | 6/1962 | Cobb | 379/439 |
| 3,049,597 | 8/1962 | Koop | 379/439 |
| 3,954,407 | 5/1976 | Andary et al. | 312/206 |
| 4,156,652 | 5/1979 | Wiest | 422/305 |
| 4,517,159 | 5/1985 | Karlson | 422/20 |
| 4,614,573 | 9/1986 | Masadu | 422/186.04 |
| 4,680,163 | 7/1987 | Blidschun et al. | 422/28 |

Primary Examiner—Jin F. Ng
Assistant Examiner—Danita R. Byrd

[57] ABSTRACT

Telephone sterilizer consisting of an electric ozone gas producing unit, consisting of a vacuum tube in which interior a electrode is fed with high current. The vacuum tube is surrounded by a negative charged mesh cylinder. Therefore, high current inside the vacuum tube will penetrate the vacuum tube in the form of electric sparks to make contact with the grounded mesh cylinder. The plurality of electric sparks surrounding the outer circumference of the vacuum tube will fuse oxygen out of the ambient to distrubute ozone gas ($O_3$) to the ear or mouthpiece of telephone handset to destroy bacteria.

3 Claims, 3 Drawing Sheets

TELEPHONE STERILIZER HAVING AN OZONE GAS PRODUCING UNIT

This application is a continuation in part of Ser. No. 668,719, now U.S. Pat. No. 4,613,928, filed on 11/6/84.

TECHNICAL FIELD

The previous invention entitled Telephone Sterilizer U.S. Pat. No. 4,613,928 introduces a bacteria killing light source which is installed at the base or base housing of the telephone apparatus to emit bacteria killing rays towards the mouthpiece of the telephone handset. The mouthpiece is made of a transparent material to allow light rays to penetrate, therefore destroying bacteria on both sides.

The present invention uses an electric source which produces ozone gas out from the ambient surrounding, whereby the produced gas then penetrates the mouth- or ear-piece of a telephone handset to destroy bacteria instantly on both sides of the handset. The benefit obtained from this invention is that the bacteria destroying gas effects a larger area and penetrates into the sound channel of the handset without any changes in design. The previous invention needed a transparent mouth- or ear-piece to allow radiation to penetrate the sound channels in order to destroy bacteria inside the handset.

BACKGROUND OF THE INVENTION

Common colds, herpes, tuberculosis, and other contagious diseases breed and hide in the dark moist confinements such as a telephone handset. This can cause an epidemic when not kept under control. Therefore, government mandates vaccination. However, no massive vaccination campaign has yet outrooted diseases. It is now a proven fact that the virus of AIDS and heamophilus can stay alive more than ten days inside the moist confinement of a telephone handset, meaning the back pocket inside the handset giving the bacteria an excellent hiding place to breed and when they become airborne they can make contact with a telephone user.

This is an irresponsible condition in particular in hospitals and administration buildings. To overcome this problem devices have been introduced to kill bacteria through the exposure of light rays or inserts which evaporates bacteria killing gases. Those devices have a handicap because they must be serviced otherwise they lose their effectiveness. It is understood that all devices can be installed at the base and inside the handset of a telephone apparatus. However, it is more practical to install it on or in the base of telephone apparatus called to prevent interfere with the design and the accoustics.

SUMMARY OF THE INVENTION

In accordance with the invention there is provided an electric source which produces ozone gases. This is achieved through a vacuum tube in which an electrode is installed in the interior. Around the circumference of the glass cylinder of the vacuum tube, a stainless steel grill or mesh is installed. Therefore, when high voltage is supplied to the electrode inside the vacuum tube, electrostatic energy in the form of electric sparks is exchanged between the vacuum tube and the metal grill concealing the vacuum tube. That means the electrode inside the vacuum tube has a positive charge, as the metal grill concealing the vacuum tube is grounded to a negative charge, closing the electric circuit. Those sparks will instantly fuse oxygen out of the ambient surrounding into an ozone gas $O_3$. The ozone gas in return will sterilize indiscriminately everything in close range and also penetrate into the tiny holes of the ear- or mouthpiece of a telephone handset. Since the vacuum tube doesn't have to produce light, but rather electrostatic sparks from the electrode inside vacuum tube the electrode is not exposed to high temperatures and therefore will outlast the life span of a telephone without additional service. The entire device to produce ozone gas consumes very little energy and therefore can be activated at all times or momentarily after the handset is put on the cradle. The device can be adopted to any telephone, meaning the handset can be positioned in vertical or horizontal position.

DETAILED DESCRIPTION OF A PREFERRED EMBODIMENT

Figure 1:
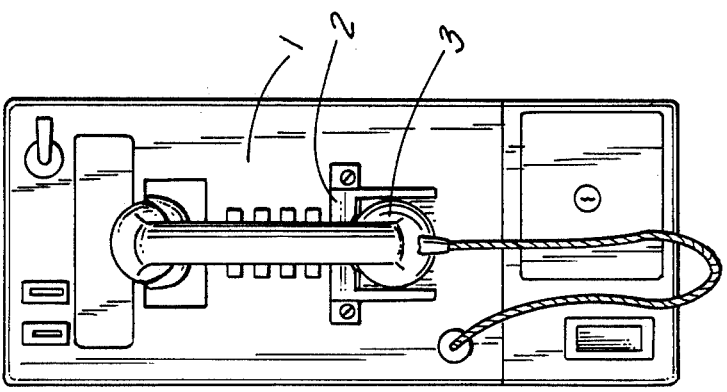
FIG. 1 is a front view of a public telephone apparatus with the telephone sterilizer device in neutral position.

Referring to FIG. 1 there is shown a public telephone(1) equipped with the device of the invention. The device can be installed inside a handset or inside the apparatus of a telephone or outside at the base housing in the form of a bracket(2). The bracket keeps the mouthpiece(3) of the handset in position to entrap ozone gas emanating out of the device.

Figure 2:
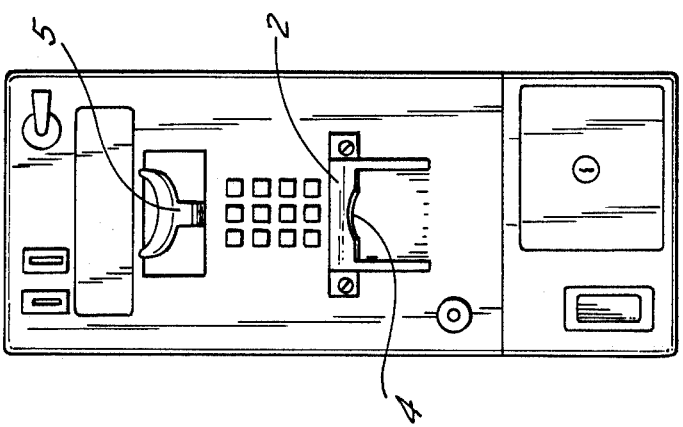
FIG. 2 is a front plan view of a public telephone without a handset to give a better view of telephone sterilizer device.

FIG. 2 shows a front view of a public telephone without handset to show the bracket(2) in which the ozone producing source is installed. The bracket in FIG. 2 has a curved edge(4) which matches the lower part of the handset which is kept in position by spring pressure applied from the upper part of handset by cradle(5).

Figure 3:
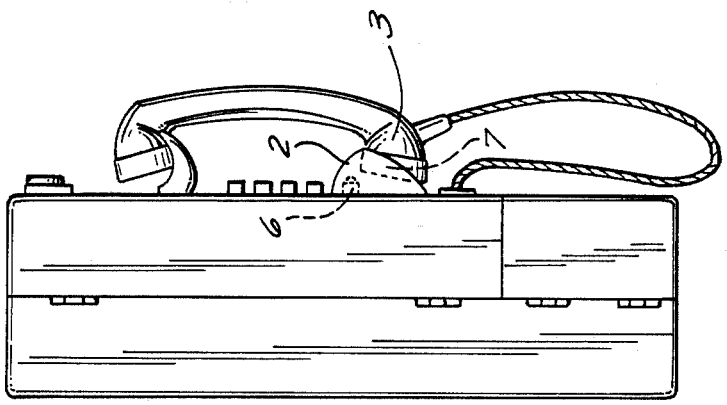
FIG. 3 is a plan side view of a public telephone with a telephone stabilizer device in action.

FIG. 3 shows a side view of a public telephone. The most favorable moment to activate the device to a given time is immediately afer use. Bracket(2) keeps lower part of handset(3) in position. Therefore, if an ozone gas producing unit(6) is installed inside bracket(2) the gas will lower itself to the mouthpiece and into the mouthpiece through the holes of the sound channel of handset thereby destroying all bacteria instantly.

Figure 4:
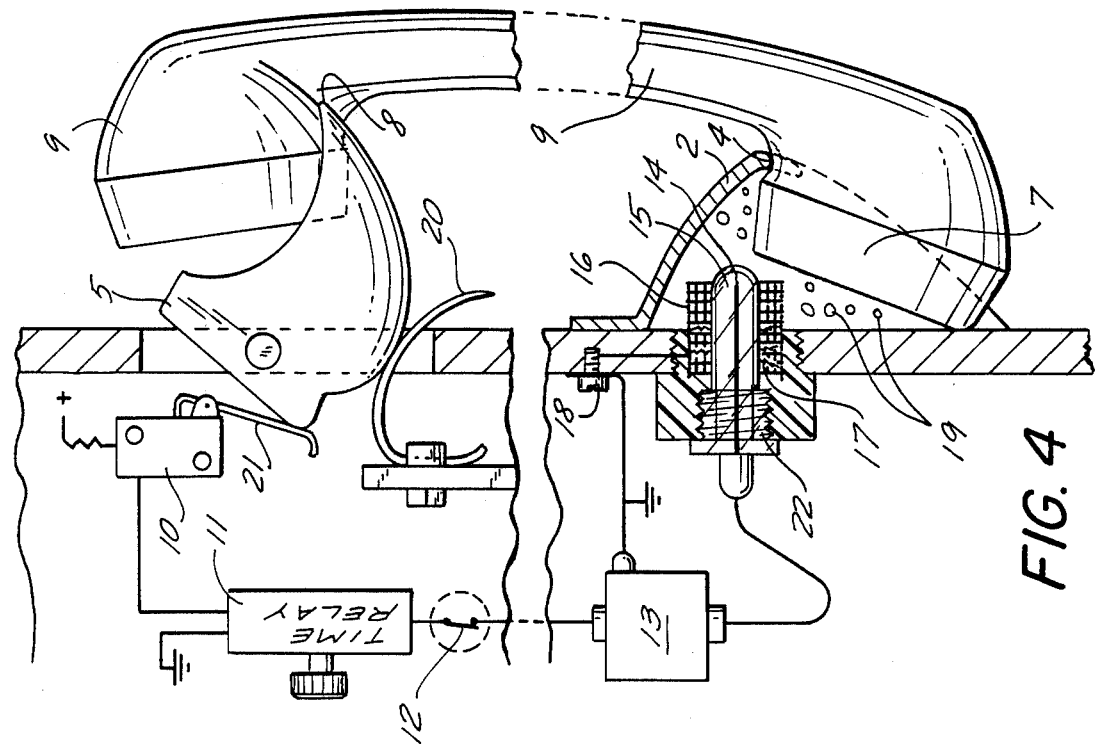
FIG. 4 is a cross section view of a public telephone with a telephone stabilizer device in action indicated by ozone gas bubbles which are emanating out from the device.

FIG. 4 shows a cross section side view of a public telephone after the handset was put on the cradle. The cradle(5) matches the lower part of earpiece(8) therefore grasping handset(9) to rest on. The weight put on cradle(5) by handset(9) will activate a microswitch(10). This will direct current from the switch into time relay(11) to close the electric circuit(12) for a given time period. In this time electricity is directed into a voltage amplifier or transformer(13). The transformer produces high voltage which is directed into the electrode(14) installed inside vacuum tube(15). The high voltage closes the gap between metal grill(16) and vacuum tube(15) by creating electric sparks(17) in the space between the grill and the vacuum tube. The metal grill(16) is connected to a ground lead(18). Sparks produced will fuse oxygen out of the ambient surrounding into ozone gas ($O_3$). The produced ozone gas is indicated by gas bubbles(19) which lower themselves on and into mouthpiece(7) to destroy bacteria on both sides. The mouthpiece is secured in this position because handset is kept up by spring pressure of spring(20) which lifts cradle(5) upwards against earpiece(8) of handset(9). In order to remove the handset from the cradle, the handset must be pushed downwards to clear matching edge(4) of bracket(2) then pulled outward. This secures a solid grip on the handset when placed on the cradle and cover of the device. Such a device is long needed in particular on ships, trains, etc. where the movement of the handset creates a disturbing noise. The sterilizing device is essential for any telephone or microphones throughout the world.

Figure 5:
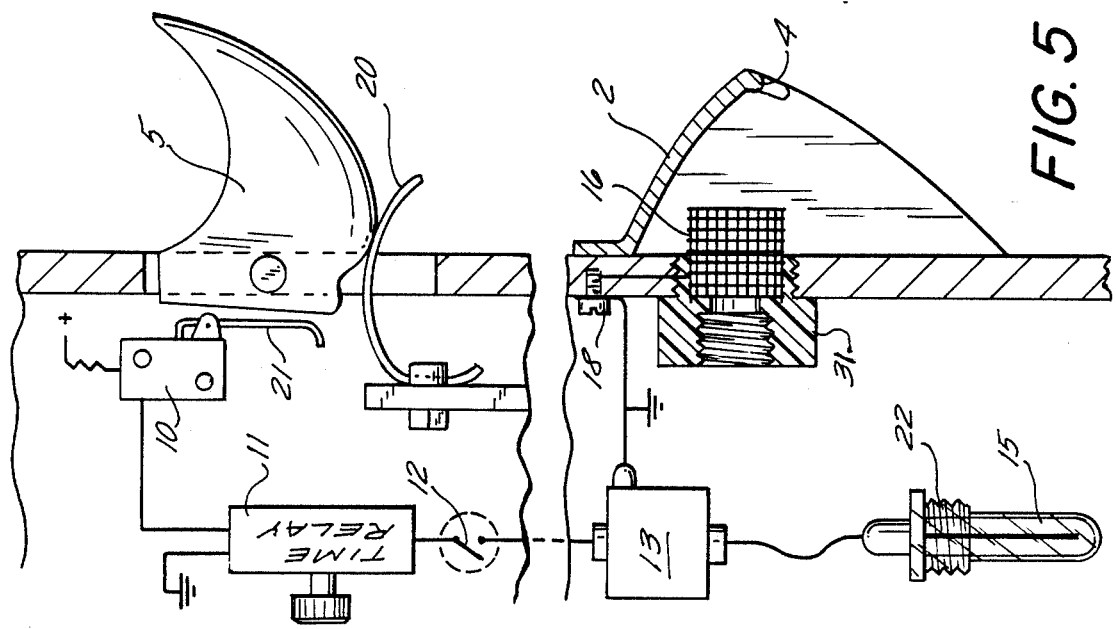
FIG. 5 is a cross section view of a public telephone with an inactive telephone sterlizer device whereby the vacuum tube is removed to show the three parts of the device, part one, vacuum tube, part 2 metal grill to discharge vacuum tube and part 3 cover to trap ozone gas and hold handset in position.

FIG. 5 shows a cross section view of a public telephone when the handset is taken off the cradle(5). The release of the handset will move cradle(5) upwards thereby releasing lever(21) of microswitch (10) to disconnect current via ozone gas producing unit. The ozone gas producing unit consists of 3 major parts. Part 1 is a voltage amplifier or transformer(13). Part 2 is a vacuum tube(15) which in this Figure is screwed out of socket(31). Part 3 is a socket carrying mesh cylinder(16), preferably stainless steel which is grounded to a negative lead(18) and insulated against the socket of vacuum tube(22). Therefore, when vacuum tube is put in the socket of mesh cylinder, the mesh cylinder conceals the glass cylinder of the vacuum tube which maintains a minute space around the circumference of vacuum tube. This gap is used to create a plurality of electrostatic sparks penetrating the vacuum tube. Those sparks producing ozone gas which kill all bacteria instantly. Ozone gas has been used very effectively for some time to purify air and water.

Figure 6:
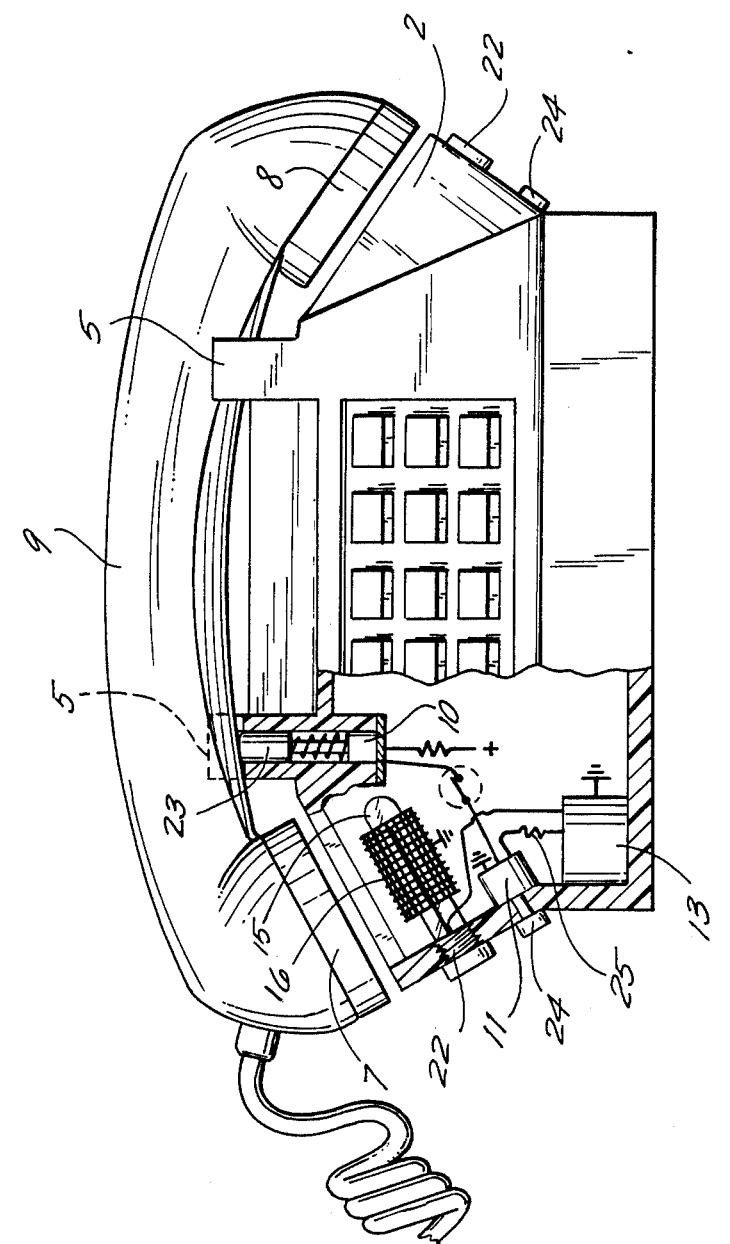
FIG. 6 is a partly sectional perspective view of a table telephone equipped with a telephone sterilizer device for the mouth- and ear-piece of a telephone handset.

FIG. 6 shows an ordinary table telephone which can be equipped with the same unit of different design. The base of the telephone apparatus must be extended to match mouthpiece(7) and earpiece(8) of handset(9). However, a telephone can also be equipped with a bracket on each side to match the ear- and mouth-piece of handset. FIG. 6 shows a partly sectional view to show the device in a favorable position.

When handset(9) is put on cradle(5) it activates a switch (10) which is activated by a piston(23) inserted between the fork of the cradle(5). The electricity from the switch is directed into a time relay(11) which has a knob(24) which can be activated from the outside to determine the time period needed to produce ozone gas. From the time-relay a positive lead(25) is directed into the voltage amplifier or transformer (13) to produce high voltage. This current is directed by a wire lead to contact the vacuum tube(22). The contact extends to the inside of vacuum tube in the form of an electrode.

The high voltage penetrates the vacuum tube(15) in the form of sparks to make contact with metal grill(16) which closes the electrical circuit of this device. Warm ozone gas produced by the spark exhange will rise upwards into mouth- or ear-piece of handset to destroy bacteria in close range. The electricity needed to activate the device to produce ozone gas can be in the range of six volts and up. Public telephones in New York City function on 110 volts. Therefore, there is no problem to feed the device with sufficient electricity at anytime. Private telephones operate generally on about 6 volts. Since the device is generally activated after a conversation, meaning when handset is put back on cradle the full voltage of the telephone can be used to activate the device. However, for a greater ozone production a separate electric line has to be installed. While there has been shown and described and pointed out, the fundamental features of the invention as applied to a preferred embodiment, it will be understood that various omissions and substitutions and changes in the form and detail of the device illustrated in its detail may be made by those skilled in the art without departing from the spirit of the invention.

I claim:

1. A telephone handset sterilizer in a telephone unit having a cradle, said telephone sterilizer consisting of an ozone gas producing unit which comprises a vacuum tube, a metal mesh cylinder, a socket, a device to provide high voltage, a time relay and a microswitch, wherein:

said socket having an inner portion;

said vacuum tube having an electrode and an outer circumference and being connected to the inner portion of the socket;

said metal mesh cylinder surrounding a portion of the outer circumference of the vacuum tube, wherein a space is formed between the metal mesh cylinder and the vacuum tube and electrostatic sparks are formed in the space by a high voltage which emanates from the electrode inside the vacuum tube, said electrostatic sparks contacting the metal mesh cylinder which is connected to a ground lead and producing ozone gas;

said time relay controlling electrical current to the device for production high voltage;

and said microswitch being connected to the time relay and arranged in the telephone unit behind the cradle, wherein depressing the cradle causes the cradle to press on a lever on the microswitch thereby activating the microswitch which is connected to the time relay, thereby activating the electrical ozone gas producing unit.

2. A telephone handset sterilizer according to claim 1 wherein the device producing high voltage consists of a transformer.

3. A telephone handset sterilizer according to claim 1 wherein the device producing high voltage consists of a voltage amplifier.

* * * * *